United States Patent [19]

Ohkura et al.

[11] Patent Number: 5,059,639

[45] Date of Patent: Oct. 22, 1991

[54] METHOD FOR PRODUCING A MATT PAINT

[75] Inventors: Ken Ohkura, Tokyo; Yukio Shinagawa, Iwata; Tamiaki Shibata, Shizuoka Prefecture, all of Japan

[73] Assignee: Dainichiseika Color & Chemicals Mfg. Co., Ltd., Tokyo, Japan

[21] Appl. No.: 498,318

[22] Filed: Mar. 26, 1990

[51] Int. Cl.$^5$ .......................... C08K 9/00; C08K 9/04; C08F 2/16
[52] U.S. Cl. ..................................... 523/205; 524/459
[58] Field of Search .......................... 523/205; 524/459

[56] References Cited

U.S. PATENT DOCUMENTS

| | | | |
|---|---|---|---|
| 4,077,804 | 3/1978 | Vanzo | 524/459 |
| 4,348,309 | 9/1982 | Pruess | 524/459 |
| 4,447,475 | 5/1984 | Lubbock | 524/459 |

*Primary Examiner*—Paul R. Michl
*Assistant Examiner*—Peter Szekely
*Attorney, Agent, or Firm*—Wegner, Cantor, Mueller & Player

[57] ABSTRACT

A method for producing a matt paint which comprises the steps of choosing a particle size of 1 to 100 μm from exactly spherical acrylic particles colored by pigment, and blending them into a paint vehicle. According to the present invention, a colored film of the matt paint can be formed, and the surface of the film shows a soft feel without stickiness.

10 Claims, No Drawings

METHOD FOR PRODUCING A MATT PAINT

BACKGROUND OF THE INVENTION

1. Field of the Invention

The present invention relates to a method for producing a matt paint which forms a colored film having a soft feel.

2. Description of the Prior Art

There are conventionally known matt paints, such as a paint obtained by blending inorganic fine powder of silica, alumina, or calcium carbonate etc. into a vehicle having an ability of making a film, or a paint obtained by blending bead-type fine particles, such as polyethylene resin, polyurethane resin, epoxy resin, polyamide resin, polyester resin etc. into a vehicle.

In the case of the former matt paint in which the inorganic fine powder, such as silica etc. is used, it can accomplish the desired matt effect by painting it on a base material. However, the surface of the film formed by said matt paint is easily damaged and does not feel smooth because it is hard and rough.

Moreover, in case of the latter matt paint in which bead-type fine particles, such as polyurethane resin etc. are used, the solvent resistance of the bead-type fine particles is inferior, and thus, the solvents that can be used are limited.

Furthermore, in case of polyethylene fine particles, the matt effect is inferior when compared with said polyurethane resin, although the solvent resistance thereof is sufficient.

Moreover, said bead-type fine particles of synthetic resin are used by blending them into the vehicle together with dyes or pigments. But, the dyes are strongly faded, and the pigments are easily separated from said bead-type fine particles of synthetic resin, and thus, in both cases, unevenness of color occurs, and a paint having a homogeneous color tone cannot be obtained.

The inventors made various studies for eliminating the afore-mentioned drawbacks of said inorganic fine powder or bead-type fine particles of synthetic resin, and consequently achieved this invention by obtaining a matt paint which provides a soft feel without stickiness, based on the flatness and smoothness of the surface of the film.

SUMMARY OF THE INVENTION

It is an object of the present invention to provide a method for producing a matt paint wherein the disadvantages found in the prior art are overcome.

It is another object of the present invention to provide such a method wherein the surface of a film of the matt paint shows a soft feel without stickiness.

It is furthermore another object of the present invention to provide such a method wherein a colored film can be formed.

According to the present invention, the above objects are accomplished by providing a method for producing a matt paint which comprises steps of choosing a particle size of 1~100 μm from exactly spherical acrylic particles colored by pigments, and blending them into a vehicle. More particularly, the above objects are accomplished by providing a method for producing a matt paint which comprises the steps of blending a pigment into a compound of a polyfunctional vinyl monomer or a mixture of said polyfunctional vinyl monomer and a monofunctional vinyl monomer, obtaining colored and exactly spherical fine particles having a particle size of 1~100 μm by heat-polymerizing said blend under the presence of a protective colloidant in a water soluble medium, and blending the obtained particles into a vehicle.

DETAILED DESCRIPTION

The present invention is illustrated in detail as follows.

(Polyfunctional vinyl monomers)

The polyfunctional vinyl monomers used in the present invention are water insoluble monomers having at least two α,β-ethylenic unsaturated double bonds in one molecule, and are exemplarily designated as the following: acrylates, the corresponding methacrylates, a mixture of the acrylates and the methacrylates, aromatic divinyl compounds, such as divinylbenzene, etc..

Said acrylates are ethylene glycol diacrylate, diethylene glycol diacrylate, triethylene glycol diacrylate, polyethylene glycol diacrylate, polypropylene glycol diacrylate, butylene glycol diacrylate, neopentyl glycol diacrylate, 1,4-buthane diol acrylate, 1,6-hexane diol diacrylate, pentaerythritol triacrylate, and trimethylol propane triacrylate.

(Monofunctional vinyl monomers)

The monofunctional vinyl monomers which are copolymerized with said monomers are monomers having one α,β-ethylenic unsaturated bond in one molecule, and are designated as follows: Ethyl acrylate, butyl acrylate, 2-ethyl hexyl acrylate, methyl methacrylate, butyl methacrylate, acrylic acid, methacrylic acid, itaconic acid, 2-hydroxy ethyl ester of acrylic acid or methacrylic acid, amides of acrylic acid or methacrylic acid, N-methylol or N-alkoxy methyl derivatives of acrylic acid or methacrylic acid, acrylonitrile, methacrylonitrile etc..

(Pigments)

The pigments blended into said monomers are designated as, for example, phthalocyanine group pigments, anthraquinone group pigments, quinacridone group pigments, indigo group pigments, thioindigo group pigments, azo group pigments, quinophthalone group pigments, perillene group pigments, isoindolinone group pigments, etc..

(Protective colloidants)

The protective colloidants are exemplified as polyvinylalcohol, hydroxyethyl cellulose, polyacrylic acid, polyacrylamide, etc..

(Surfactants)

In the present invention, surfactants can be used together with said protective colloidants, and they are exemplified as usual anionic surfactants, such as alkyl sodium sulfate, alkylallyl sodium sulfate, sodium salt of fatty acid etc., nonionic surfactants, such as polyoxyethylene dodecylether, polyoxyethylene octylphenolether etc., and others.

(Polymerization initiators)

Polymerization initiators are used in the present invention, and are exemplified as radical polymerization initiators, such as azobis isobutylonitrile, azobis valeronitrile, benzoilperoxide, t-butylperoxide etc..

(Production)

The colored and exactly spherical fine particles of the present invention are produced as follows.

First of all, pigments are blended into a polyfunctional vinyl monomer or a mixture of said monomer and a monofunctional vinyl monomer, and then, the obtained blend is mixed homogeneously by a roll mill or sand mill. After decreasing the viscosity of said blend by adding thereinto, a hydrophilic medium and a radical polymerization initiator, a solution containing a protective colloidant and water, which is separately prepared, is furthermore added into said blend. Then, the blend is stirred by a high speed stirrer having shearing force with observation of the particle size by a microscope, and when the particle size reaches a desired size, the stirring is stopped. After the content is transfered into a vessel having an ordinary wing stirrer, it is heated to a temperature of 50° C. to 55° C. to remove a part of the medium, and furthermore, the temperature is raised to 65° C. to 70° C. to finish the polymerization reaction.

(Paint Vehicle)

As paint vehicles which are another essential ingredient in the present invention, all of the ones used in the past, in air dry paints or thermo-setting paints, are used in the present invention.

The air dry paints are exemplified as vinyl chloride-vinyl acetate copolymer resin paint, polyvinylalcohol resin paint, polyvinylbutyral resin paint, butyl methacrylate resin paint, methyl methacrylate resin paint, various kinds of oil-modified alkyd resin paint, etc..

The low temperature thermo-setting paints are shown as melamine alkyd resin paint, amino alkyd resin paint, thermo-setting acrylic resin paint, epoxy resin paint, polyurethane resin paint, etc..

(Blend)

In the present invention, said ingredients of resin paints are dissolved into a solvent, and the colored and exactly spherical fine particles are blended thereinto in an amount of 5 to 75 percents by weight, preferably 15 to 65 percents by weight to said resin ingredients.

Furthermore, viscosity increaser, extender pigments, stabilizers, surfactants etc. can be used in the present invention according to demand.

The solvents to be used are ones used in the ordinary paints, and are exemplified as alcohol, esters of acetic acid, acetone, methylisobutyl ketone, aromatic compounds, cellosolve, etc..

EXAMPLE

EXAMPLE 1

TABLE 1

| | | Examples | | | | | |
|---|---|---|---|---|---|---|---|
| | | 1-1 | 1-2 | 1-3 | 1-4 | 1-5 | 1-6 |
| Polyfunctional vinyl monomers | Ethylene oxide modified bisphenol A diacrylate | 40 | 30 | | 46 | 40 | |
| | Trimethylolpropane triacrylate | | 30 | 40 | | | 30 |
| | Pentaerythritol tetramethacrylate | | 20 | | | | 10 |
| | Polyethylene glycoldiacrylate | | | | 10 | 10 | |
| | 1,6-hexamethylene-diacrylate | | | 24 | 24 | | 40 |
| Monofunctional vinyl monomers | Butylmethacrylate | 40 | | | | | |
| | Stearyl methacrylate | | | 16 | | | |
| | Methylmethacrylate | | | | | 30 | |
| AIBN (Polymerization initiator) | | 0.8 | 0.8 | 0.8 | 0.8 | 0.8 | 0.8 |
| Carbon Black | | | | | 16 | | |
| Red iron oxide | | | | | | 24 | |
| Titanium dioxide | | | | | | | 24 |
| Copper Phthalocyanine Blue | | 4 | | | | | |
| Disazo Yellow | | | 4 | | | | |
| Carbon Black | | | | 4 | | | |

(notes)
[AIBN] means azoiso butylonitrile.

The monomers and pigment dispersions, which are respectively blended as mentioned in examples 1-1 to 1-6 on Table 1, are added into a water solution consisting of 10 parts by weight of polyvinylalcohol and 200 parts by weight of water at a temperature of 50° C. with stirring by a high speed stirrer (DISSOLVER) to obtain a suspension having an average particle size 30 μm. The suspension is kept at 65° to 75° C. for 50 minutes with stirring by a propeller type stirrer to polymerize it.

Then, the polymerized slurry is filtrated, washed by water and dryed at 60° C. for 30 minutes to obtain the colored and exactly spherical fine particles.

EXAMPLE 2

The colored and exactly spherical particles obtained in example 1-2 . . . 1.6 parts by weight,
the colored and exactly spherical particles obtained in example 1-5 . . . 0.8 parts by weight,
acryl lacquer (Trade name: ACRIC 1026 CLEAR, KANSAI PAINT CO., LTD.) . . . 20.0 parts by weight,
thinner (Trade name: ACRIC 1043 THINNER, KANSAI PAINT CO., LTD.) . . . 10.0 parts by weight.

Said blend is dispersed by a paint shaker for 30 minutes to obtain a composition of a matt paint.

Then, the paint composition is diluted to a suitable viscosity with a thinner, and is painted on a coating paper by a spray. The surface of the painted film is observed by a 60 degree mirror reflector to determine the gloss thereof. As a result, the reflection is less than 5%, the surface of the film shows a matt condition which provides a soft feel, and heat, light and solvent resistances are excellent, respectively.

EXAMPLE 3

The colored and exactly spherical particles obtained in example 1-2 . . . 1.2 parts by weight,
the colored and exactly spherical particles obtained in example 1-6 . . . 8.8 parts by weight, alkyd resin (Trade name: HITALOID 2462A HITACHI KASEI CO., LTD.) . . . 13.8 parts by weight, xylene . . . 10.0 parts by weight.

Said blend is dispersed by a paint shaker for 30 minutes, and thereafter, 5 parts by weight of melamine resin (Trade name: MELAN 28 HITACHI KASEI CO., LTD.) are added thereinto and the blend is stirred to obtain a matt paint.

Then, the matt paint is diluted with xylene and painted by a spray on an aluminum plate, and thereafter, it is baked at 140° C. for 30 minutes. The surface of the painted film is observed with a 60 degree mirror reflector to determine the gloss thereof. As a result, the reflection is less than 5%, the surface of the film shows a matt condition which provides a soft feel, and heat, light and solvent resistances are excellent, respectively.

EXAMPLE 4

The colored and exactly spherical particles obtained in example 1-4 . . . 1.2 parts by weight,
the colored and exactly spherical particles obtained in example 1-3 . . . 5.6 parts by weight,
the colored and exactly spherical particles obtained in example 1-5 . . . 3.2 parts by weight,
acrylpolyol (Trade name: HITALOID 3001 HITACHI KASEI CO., LTD.) . . . 14.6 parts by weight,
toluene . . . 10 parts by weight.

Said blend is dispersed by a paint shaker for 30 minutes, and thereafter, 3.7 parts by weight of polyisocyanate (Trade name: [BURNOCK] DAINIPPON INK AND CHEMICALS INC.) are added thereinto and the blend is stirred and mixed to obtain a matt paint.

Then, the matt paint is diluted with toluene and painted by a spray on an acrylic resin board, and thereafter it is dryed at 70° C., for 5 minutes. The surface of the painted film is observed with a 60 degree mirror reflector to determine the gloss thereof. As a result, the reflection is less than 5%, the surface of the film shows a matt condition which provides a soft feel, and heat, light and solvent resistances are excellent, respectively.

Comperative example 1

The exactly spherical polyethylene particles . . . 10.0 parts by weight,
acrylic lacquer (Trade name: [ACRIC 1026 CLEAR] KANSAI PAINT CO., LTD.) . . . 25.0 parts by weight,
cupper phthalocyanine pigment . . . 1.5 parts by weight,
titanium dioxide pigment . . . 5.0 parts by weight,
thinner . . . 17.0 parts by weight.

Said blend is painted on a coating paper by a spray in the same manner as in example 1. The obtained surface of the film shows a soft feel. The surface of the painted film is observed with a 60 degree mirror reflector to determine the gloss thereof. As a result, however, the reflection is 65%, and the matt condition is inferior compared with the present invention in which the colored and exactly spherical particles are used.

Comparative example 2

Exactly spherical polyurethane particles . . . 10.0 parts by weight,
acrylpolyol (Trade name: [HITALOID 3001] HITACHI KASEI CO., LTD.) . . . 14.6 parts by weight,
titanium dioxide pigment . . . 3.8 parts by weight,
toluene . . . 10.0 parts by weight.

Said blend is dispersed by a paint shaker for 30 minutes, and then, 3.7 parts by weight of polyisocyanate (Trade name: [BURNOCK] DAINIPPON INK AND CHEMICALS INC.) are added thereinto and the blend is stirred and mixed to obtain a paint.

The paint is painted on an acrylic resin board by a spray.

The surface of the painted film is observed with a 60 degree mirror reflector to determine the gloss thereof. As a result, the reflection is 86%.

It is considered that the matt effect is insufficient since some of the exactly spherical polyurethane particles are resolved or swelled with toluene.

The matt paint of the present invention is excellent in light, heat and solvent resistances, and forms a matt film having a soft feel without stickiness.

Moreover, the matt paint of the present invention does not exhibit color separation and provides a homogeneous and colored film even though plural colors are used in combination, since the exactly spherical polymer particles are themselves colored by pigments.

Furthermore, the colored and exactly spherical particles used in the present invention are formed by resin beads excellent in light and heat resistances, and thus, the present matt paint can be used not only in air dry paint but also in thermo-setting paint, and further, the present matt paint is excellent in solvent resistance, and thus, it is suitable for paints composed of various kinds of solvents.

Moreover, the matt paint of the present invention forms a matt film, the surface of which is difficult to get damaged, and provides a soft feel, and thus, it is utilized as materials in various kinds of field, such as materials for room decoration, inner parts of cars, furnitures, office machines etc..

What is claimed is:

1. A method for producing a matt paint comprising:
   (a) homogeneously blending a pigment with a polyfunctional vinyl monomer having at least two $\alpha,\beta$-ethylenic unsaturated double bonds in a monomer molecule and which is insoluble in water to obtain a homogeneous blend of said pigment and said polyfunctional vinyl monomer;
   (b) dispersing the homogeneous blend in water with a protective colloidant at a controlled particle size between 1 to 100 $\mu$m;
   (c) heat polymerizing the dispersion to obtain colored and spherical fine particles having said particle size; and
   (d) blending the particles in a paint vehicle to obtain a matt paint.

2. A method for producing a matt paint as claimed in claim 1, wherein said pigment is homogeneously blended with a monofunctional vinyl monomer in addition to said polyfunctional vinyl monomer.

3. A method for producing a matt paint as claimed in claim 1, wherein the paint vehicle is an air dry paint vehicle or a thermo-setting paint vehicle.

4. A method for producing a matt paint as claimed in claim 1, wherein the polyfunctional vinyl monomers are acrylates, the corresponding methacrylates, a mixture of said acrylates and the methacrylates, or aromatic divinyl compounds.

5. A method for producing a matt paint as claimed in claim 4, wherein the acrylates are selected from the group consisting of ethylene glycol diacrylate, diethylene glycol diacrylate, triethylene glycol diacrylate, polyethylene glycol diacrylate, polypropylene glycol diacrylate, butylene glycol diacrylate, neopentyl glycol diacrylate, 1,4-butane diol acrylate, 1,6-hexane diol diacrylate, pentaerythritol triacrylate, and trimethylol propane triacrylate.

6. A method for producing a matt paint as claimed in claim 2, wherein the monofunctional vinyl monomers are monomers having one $\alpha,\beta$-ethylenic unsaturated bond in a monomer molecule.

7. A method for producing a matt paint as claimed in claim 2, wherein said monofunctional vinyl monomer is selected from the group consisting of ethyl acrylate, butyl acrylate, 2-ethyl hexyl acrylate, methyl methacrylate, butyl methacrylate, acrylic acid, methacrylic acid, itaconic acid, 2-hydroxy ethyl ester of acrylic acid or methacrylic acid, amides of acrylic acid or methacrylic acid, N-methylol or N-alkoxy methyl derivatives of acrylic acid or methacrylic acid, acrylonitrile, and methacrylonitrile.

8. A method for producing a matt paint as claimed in claim 1, wherein the pigment is selected from the group consisting of phthalocyanine group pigments, anthraquinone group pigments, quinacridone group pigments, indigo group pigments, thioindigo group pigments, azo group pigments, quinophthalone group pigments, perillene group pigments, and isoindolinone group pigments.

9. A method for producing a matt paint as claimed in claim 1, wherein the protective colloidant is selected from the group consisting of polyvinylalcohol, hydroxyethyl cellulose, polyacrylic acid, and polyacrylamide.

10. A method for producing a matt paint as claimed in claim 6, wherein said monofunctional vinyl monomers are selected from the group consisting of ethyl acrylate, butyl acrylate, 2-ethyl hexyl acrylate, methyl methacrylate, butyl methacrylate, acrylic acid, methacrylic acid, itaconic acid, 2-hydroxy ethyl ester of acrylic acid or methacrylic acid, amides of acrylic acid or methacrylic acid, N-methylol or N-alkoxy methyl derivatives of acrylic acid or methacrylic acid, acrylonitrile, and methacrylonitrile.

* * * * *